United States Patent

Okuno et al.

Patent Number: 5,976,611
Date of Patent: Nov. 2, 1999

[54] OPTICAL FIBER COATING METHOD AND APPARATUS THEREFOR

[75] Inventors: Kaoru Okuno; Akira Inoue; Kazumasa Oishi; Kohei Kobayashi; Ichiro Tsuchiya, all of Yokohama, Japan

[73] Assignee: Sumitomo Electric Industries, Ltd., Oska, Japan

[21] Appl. No.: 08/860,831

[22] PCT Filed: Oct. 4, 1996

[86] PCT No.: PCT/JP96/02889

§ 371 Date: Jun. 6, 1997

§ 102(e) Date: Jun. 6, 1997

[87] PCT Pub. No.: WO97/12841

PCT Pub. Date: Apr. 10, 1997

[30] Foreign Application Priority Data

Oct. 6, 1995 [JP] Japan .................................. 7-260308

[51] Int. Cl.⁶ ................................................... B05D 1/00
[52] U.S. Cl. .......................... 427/8; 427/163.2; 427/434.6; 427/434.7; 118/665; 118/667; 118/683; 118/684; 118/688; 118/692; 118/708; 118/712; 118/405; 118/411; 118/412; 118/420
[58] Field of Search .................. 118/665–667, 683, 118/684, 688, 692, 708, 712, 405, 411, 412, 420; 427/163.2, 8, 434.6, 434.7; 65/377, 379; 425/135, 113

[56] References Cited

U.S. PATENT DOCUMENTS 4,577,588 3/1986 Mautret et al. .................... 118/405
4,631,078 12/1986 Tomlinson et al. .................. 427/163.2
4,740,055 4/1988 Kanda et al. ........................ 350/96.3
5,047,386 9/1991 Hed ..................................... 118/420

FOREIGN PATENT DOCUMENTS

| 61-72656 | 4/1986 | Japan . |
| 64-65430 | 3/1989 | Japan . |
| 2-25854 | 6/1990 | Japan . |
| 3-208839 | 9/1991 | Japan . |
| 4-198035 | 7/1992 | Japan ..................... 65/377 |
| 5-37938 | 6/1993 | Japan . |
| 5-271324 | 10/1993 | Japan . |

Primary Examiner—Laura Edwards
Attorney, Agent, or Firm—Pillsbury Madison & Sutro LLP

[57] ABSTRACT

The present invention relates to an optical fiber coating method and an apparatus therefor which can form high quality coating layer on an optical fiber (12) by preventing non-concentricity of a coating resin (14) applied on the optical fiber (12) and admixing of bubble. The optical fiber coating apparatus according to the present invention includes at least one pair of an illumination light introducing window (39) and an optical fiber monitoring window (40) formed facing each other with the resin pool between in a side wall portion of a die holder (17), opposing a resin pool (27), a light source (41) opposing to the illumination light introducing window (39) and projecting an illumination light toward the center portion of the resin pool (27), an image pick-up device (42) opposing the optical fiber monitoring window (40) for monitoring at least a contact portion between the optical fiber (12) and the coating resin (14) and in the vicinity thereof, and coating condition modifying means for modifying a coating condition of the coating resin (14) with respect to the optical fiber (12) on the basis of the result of observation of the image pick-up device (42).

20 Claims, 7 Drawing Sheets

OPTICAL FIBER COATING METHOD AND APPARATUS THEREFOR

BACKGROUND OF THE INVENTION

1. Field of the Invention

The present invention relates to an optical fiber coating method and apparatus therefor, which can form a high quality coating layer on an optical fiber which is drawn at high speed.

2. Description of the Related Art

An optical fiber drawn from a drawing furnace is normally provided a primary coating to be a buffer layer with an ultraviolet curing resin, silicon resin or the like, before contacting with a solid substance, such as a take-up roller. Furthermore, a secondary coating layer for reinforcement is provided with an ultraviolet curing resin, nylon or the like.

As such conventional optical fiber coating apparatus, the apparatus disclosed in Japanese Patent Application Publication No. 2-25854 (1990), Japanese Patent Application Laid-Open No. 61-72656 (1986), Japanese Patent Application Publication No. 5-37938 (1993), Japanese Patent Application Laid Open No. 64-65430 (1989), for example, have been known.

The apparatus disclosed in Japanese Patent Application Publication No. 2-25854 detects a center position of an optical fiber drawn from a drawing furnace by means of a measuring unit. Then, the overall coating apparatus is shifted along a plane perpendicular to an axis of the optical fiber by means of a motor so that it may be aligned with the optical fiber coaxially. Thereby, the coating layer of uniform thickness is formed on the optical fiber.

The apparatus disclosed in Japanese Patent Application Laid-Open No. 61-72656 measures an external diameter of the optical fiber with a coating resin layer after passing through a coating die set by an external diameter measuring device. On the basis of the measured value, a supplying pressure of a resin supplied in the coating die set is controlled. Thereby, the optical fiber having a coating layer of uniform external diameter can be obtained.

The apparatus disclosed in Japanese Patent Application Publication No. 5-37938 detects concentricity of a coating resin layer applied by a coating application device with respect to the optical fiber by means of a monitoring device. On the basis of result of detection, the coating application device is inclined about an orthogonal two axes (these two axes are located on a plane perpendicular to the axis of the optical fiber) taking a lower side outlet orifice of the coating application device as a center. Thereby, non-concentricity of the coating resin layer with respect to the optical fiber can be restricted.

In the apparatus disclosed in Japanese Patent Application Laid-Open No. 64-65430, the optical fiber on which the primary coating resin in an upper tank have been supplied, is guided in a pool of a secondary coating resin which is supplied into the lower tank. Then, a transmitted illumination light is projected to the optical fiber to detect the non-concentricity of the primary coating resin layer. On the basis of this, the position of the upper tank relative to the optical fiber is corrected so as to reduce magnitude of non-concentricity.

If the thickness of the primary coating layer or the secondary coating layer formed on the optical fiber is non-uniform, a microbending phenomenon due to variation of ambient temperature, external force applied on the optical fiber or the like, namely, irregular bending, may be caused on the optical fiber resulting in increase transmission loss of the optical fiber. Also, when the thickness of the primary coating layer or the secondary coating layer is non-uniform, strength at the portion where the coating layer is thin, becomes relatively low to increase tendency to snap at such portion. Furthermore, if a bubble is admixed in the coating resin layer, the strength of the optical fiber at such portion becomes relatively low. In addition, since the volume of the bubble varies depending upon variation of the ambient temperature, the foregoing microbending phenomenon is caused to increasing transmission loss of the optical fiber.

Recently, as optical fiber preform have expanded in length, drawing speed is becoming higher. When the optical fiber is drawn at such high speed, it may be possible to reduce non-concentricity of the coating resin layer by the conventional coating apparatus disclosed in Japanese Patent Application Laid-Open No. 64-65430. However, it is inherently required to detect the magnitude of non-concentricity as a numerical value which is difficult to calculate. Furthermore, it is not possible to make the thickness of the coating resin layer uniform or to prevent bubbles from being included in order to form the high quality coating layer. In addition, since the optical fiber after applying and curing the primary coating resin is observed in the secondary coating resin, a dedicated observing means becomes necessary for measuring the magnitude of non-concentricity to observe the optical fiber after secondary coating. As a result, facility becomes large.

On the other hand, in the invention disclosed in Japanese Patent Application Publication 2-25854, an adjustment for the non-concentricity consisting of shifting the magnitude of the coating device is not sufficient to is adjust uniformity sufficiently. Since fluctuation of the thickness of the coating resin layer does not depend on variation of the supplying pressure, it is not possible to maintain a uniform layer thickness by the method disclosed in Japanese Patent Application Laid-Open No. 61-72656. In the invention disclosed in Japanese Patent Application Publication No. 5-37938, the concentricity monitoring device is required but there is no disclosure for how the fluctuation of the external diameter of the coating resin layer can be restricted.

Furthermore, in these conventional apparatuses, associated with increasing of drawing speed of the optical fiber, delicate variation of the drawing condition, such as temperature or drawing tension of the optical fiber, and supplying pressure or temperature of the coating resin, which has not been significantly affected upon drawing at low speed, should affect for flow condition of the resin to be applied. As a result, non-concentricity of the coating resin layer or non-uniformity of the layer thickness can be caused, and admixing of bubble in the coating resin layer is potentially caused.

Particularly, when the drawing speed of the optical fiber becomes higher, the thickness of the coating resin layer can fluctuate to create an unstable condition. Simultaneously, the non-concentric condition becomes unstable as often as not, and the applying condition of coating resin layer become unstable. In such case, there is not suggested or disclosed as to how the coating device is to be adjusted in the conventional apparatus.

An object of the present invention is to provide an optical fiber coating method which can obtain a high quality coating layer on an optical fiber by reducing non-concentricity or fluctuation of thickness of a coating resin layer applied to the optical fiber drawn at high speed and by preventing admixing of bubbles.

Another object of the present invention is to provide an optical fiber coating apparatus which can realize such optical fiber coating method.

SUMMARY OF THE INVENTION

In the first aspect of the present invention, an optical fiber coating method provides a resin pool for supplying a coating resin between a gate member and a die, and passes an optical fiber from a through hole formed at the center portion of the gate member through a nozzle formed at the center portion of the die to apply the coating resin, wherein the coating resin is applied on the optical fiber and a contacting portion and a vicinity thereof between the optical fiber and the coating resin is monitored.

Here, the coating resin may be a primary coating resin, and may be a secondary coating resin to be applied on the optical fiber on which a primary coating is applied. It is preferred that a shape of a meniscus of the surface of the coating resin in the resin pool drawn associated with movement of the optical fiber is observed, and the position of the gate member is adjusted within a plane perpendicular to the passing direction of the optical fiber so that the meniscus becomes symmetric with respect to the optical fiber. Similarly, the presence and absence of bubbles between the optical fiber and the coating resin may be effectively observed, and when the bubble is monitored, at least one of either a supplying pressure of the coating resin or a temperature of the optical fiber is controlled to avoid admixing of bubbles. Also, it is preferred that the flow condition of the coating resin around the optical fiber is observed. The temperature of the coating resin is controlled so as to stabilize the flow condition of the coating resin and to eliminate deflection of the optical fiber in a direction perpendicular to the passing direction of the optical fiber, or inclination angles of the gate member, the die and the resin pool with respect to the passing direction of the optical fiber are simultaneously adjusted so that the flow condition of the coating resin becomes stable and deflection of the optical fiber in the direction perpendicular to the passing direction of the optical fiber is avoided.

On the other hand, according to the second aspect of the present invention, an optical fiber coating apparatus comprising a die formed with a nozzle to pass an optical fiber at a center portion, a gate member defining a resin pool to be supplied a coating resin with the die and formed a through hole to pass the optical fiber at a center portion, and a die holder holding the die and the gate member spaced apart so as to coaxially align the nozzle and the through hole.

At least one pair of an illumination light introducing window and an optical fiber monitoring window formed facing each other with the resin pool between in a side wall portion of the die holder is provided.

A light source opposes to the illumination light introducing window and projecting an illumination light toward the center portion of the resin pool.

An image pick-up device opposes the optical fiber monitoring window for monitoring at least a contact portion between the optical fiber and the coating resin and in the vicinity thereof and a coating condition modifying means for modifying a coating condition of the coating resin with respect to the optical fiber on the basis of the result of observation of the image pick-up device is provided.

Here, the gate member may be a nipple or a die for applying a primary coating on the optical fiber. In this case, the coating resin is a secondary coating resin applied on the optical fiber on which a primary coating is applied. The illumination light introducing window and the optical fiber monitoring window may be provided in two pairs, the direction of one pair of the illumination light introducing window and the optical fiber monitoring window is different from the direction of another pair. The coating condition modifying for adjusting a relative position between the die and the gate member, a resin supplying pressure adjusting means modifying supplying pressure of the coating resin into the resin pool, a fiber temperature adjusting means modifying the temperature of the optical fiber, resin temperature adjusting means for modifying temperature of a coating resin within the resin pool, or adjusting means of a tilt angle of the die holder in which the die and the gate member are assembled. The coating resin may be an ultraviolet curing resin, and the illumination light inciding into the resin pool from the light source may not have a component of a curing wavelength band.

According to the present invention, the die and the gate member are held with a space for a resin pool between them in the die holder. Then, the coating resin from the resin pool is supplied. The optical fiber passes the nozzle of the die from the through hole of the gate member via the resin pool. Then, the coating resin is applied on the outer surface of the optical fiber.

On the other hand, the illumination light from the light source is projected to the optical fiber through the illumination light introducing window and the coating resin in the resin pool. Then, the image pick-up device opposing thereto at an angle of 180° monitors at least the contact portion between the optical fiber and the coating resin and in the vicinity thereof via the optical fiber monitoring window. Then, on the basis of the result of monitoring by the image pick-up device, the coating condition of the coating resin on the optical fiber is modified by the coating condition modifying means.

For example, the shape of the meniscus of the surface of the coating resin in the resin pool drawn associated with passage of the optical fiber is monitored, and the relative position of the gate member and the die is adjusted by operating the position adjusting means so that the shape of meniscus becomes symmetric relative to the optical fiber. On the other hand, presence and absence of the bubble between the optical fiber and the coating resin is monitored. When bubble is monitored, the coating resin supplying pressure is controlled by the resin supplying pressure adjusting means. Alternatively, the temperature of the optical fiber fed into the optical fiber coating apparatus is controlled by the fiber temperature adjusting means. Furthermore, by monitoring the flow condition of the coating resin around the optical fiber, the temperature of the coating resin in the resin pool is controlled by the resin temperature adjusting means, or the tilt angle of the die holder in which the die and the gate member is assembled, is controlled so that the flow condition of the coating resin is stable as well as the deflection of the optical fiber in the direction perpendicular to the passing direction of the optical fiber.

Thus, since at least one pair of the illumination light introducing window and the optical fiber monitoring window formed facing each other with the resin pool between in a side wall portion of the die holder, a light source opposing to the illumination light introducing window and projecting an illumination light toward the center portion of the resin pool, an image pick-up device opposing the optical fiber monitoring window for monitoring at least a contact portion between the optical fiber and the coating resin and in the vicinity thereof, and coating condition modifying means for modifying a coating condition of the coating resin with respect to the optical fiber on the basis of the result of observation of the image pick-up device are provided to apply the coating resin on the optical fiber. By monitoring the contact portion between the optical fiber and the coating resin and in the vicinity thereof, non-concentricity of the optical fiber may be reduced and the coating layer thickness may be maintained constant. Furthermore, high quality coating layer without bubbles can be formed on the surface of the optical fiber.

In this case, where the coating resin is the primary coating resin or the secondary coating resin no problem should arise.

On the other hand, when the position of the gate member is adjusted within the plane perpendicular to the passing direction of the optical fiber by the position adjusting means so that the shape of the meniscus of the surface of the coating resin in the resin pool drawn associated with the passage of the optical fiber becomes symmetric, magnitude of non-concentricity can be made smaller.

Furthermore, by monitoring the presence and absence of bubbles between the optical fiber and the coating resin, and by operating at least one of the resin supplying pressure adjusting means and the fiber temperature adjusting means, bubbles can be easily removed.

Then, by monitoring the flow condition of the coating resin around the optical fiber, when the temperature of the coating resin is controlled by operating the resin temperature adjusting means, or when the tilt angle of the die holder assembled with the die and the gate member is controlled so that the flow condition of the coating resin and the deflection off the optical fiber in the direction perpendicular to the passing direction of the optical fiber becomes stable, the thickness of the coating resin layer may be maintained constant.

It should be noted that when the fluctuation of the thickness of the coating resin layer and the fluctuation of non-concentricity are caused, the non-concentricity is stably maintained constant.

Also, when the illumination light introducing window and the optical fiber monitoring window are provided in two pairs and in different directions from each other, high quality coating layer can be formed over the overall circumference of the optical fiber.

Furthermore, when the ultraviolet curing resin is used as the coating resin, and the illumination light in the resin pool from the light source has no component of the curing wavelength band, a curing problem of the coating resin in the resin pool can be avoided.

DETAILED DESCRIPTION OF THE INVENTION

An embodiment of an optical fiber coating apparatus according to the present invention, which can realize an optical fiber coating method according to the present invention will be described in detail with reference to FIGS. I to 7.

Figure 1:
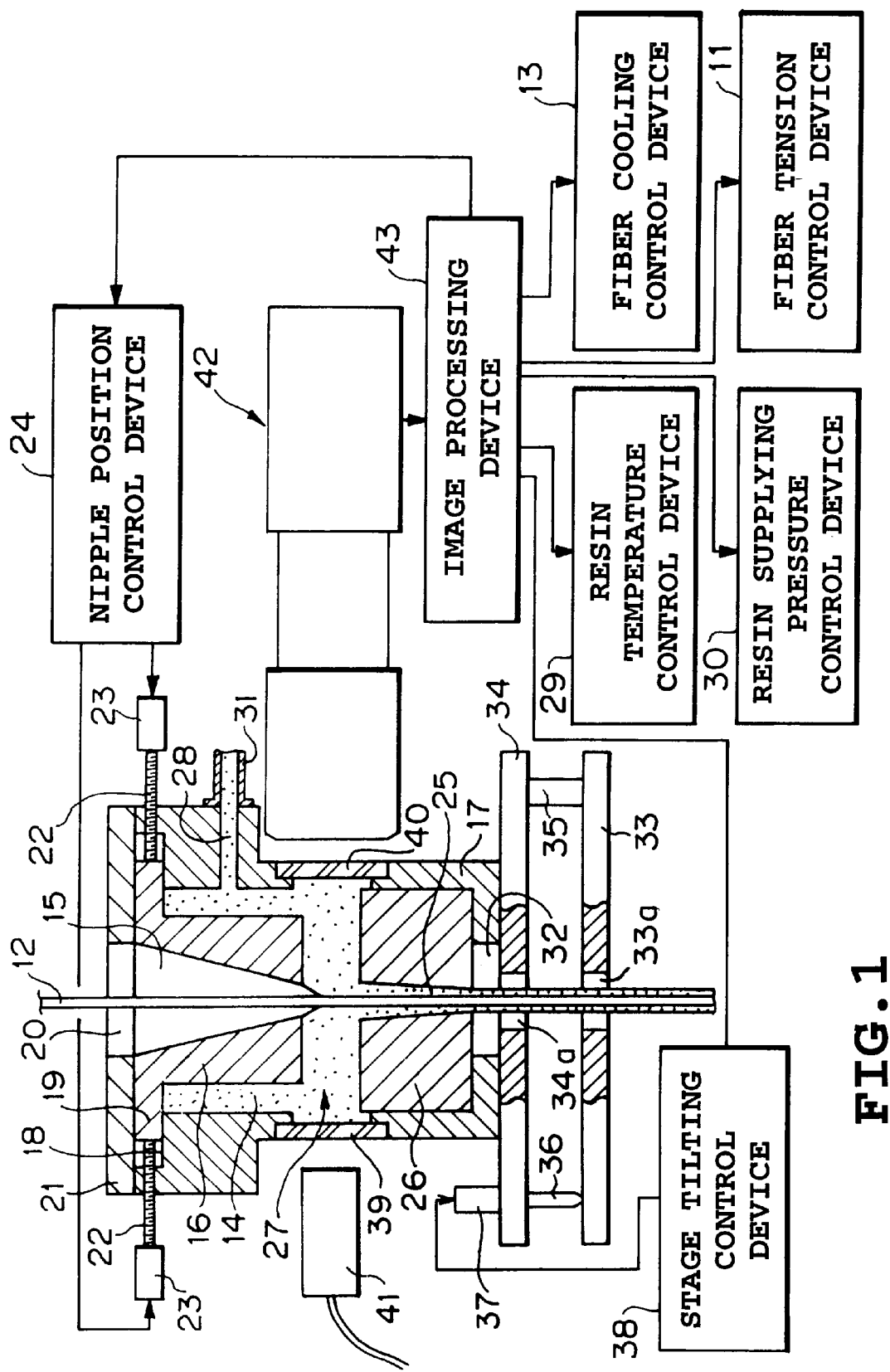
FIG. 1 is a conceptual illustration of one embodiment utilizing an optical fiber coating apparatus according to the present invention for forming a primary coating layer.

A general construction of one embodiment, in which an optical fiber coating apparatus according to the present invention is applied for a primary coating, is illustrated in FIG. 1. The optical fiber coating apparatus is designed for forming a primary coating layer of a predetermined layer thickness of a coating resin 14 on the outer surface of an optical fiber 12 by the optical fiber coating apparatus, after drawing the optical fiber 12 from a not shown optical fiber drawing furnace under a predetermined tension by the fiber tension control device 11 provided below the optical fiber coating apparatus and cooling down to a predetermined temperature through a fiber cooling control device 13 provided right above the optical fiber coating apparatus.

An annular flange portion 19 which is slidably mounted on a step portion 18 formed on the upper end portion of a cylindrical die holder 17, is formed on the outer edge portion at the upper end of a cylindrical nipple 16 in which a tapered through hole 15 having diameter descending downwardly is formed at the center portion. An annular closure plate 21 having an opening 20 at the center portion, is mounted on the upper end of the die holder 17 receiving the nipple 16. By the closure plate 21 and the step portion 18 of the die holder 17, the flange portion 19 of the nipple 16 is tightly clamped. Thereby, the nipple 16 is held so as to not to loosen from the die holder 17.

The tip ends of two sets of screws 22 for nipple position correction which face each other and are 180° apart, are contacted to the outer surface of the flange portion 19 of the nipple 16 movable in a direction perpendicular to a passing direction (from upper side to the lower side in the drawing) of the optical fiber 12. Opposing direction (left and right direction in the drawing, hereinafter referred to as X direction) of one set of the nipple position correcting screws 22 is shifted in phase by 90° with respect to the opposing direction (direction perpendicular to the sheet plane of the drawing, hereinafter referred to as Y direction) of the other set of the nipple position correcting screws not shown. To these nipple position correcting screws 22, screw driving motors 23 are respectively connected for correcting position of the through hole 15 of the nipple 16 to the die holder 17 by adjusting a screwing magnitude of the nipple position correcting screws 22 to the die holder 17. Projecting positions in the diametric direction of the nipple position correcting screws 22 which are connected to the screw driving maters 23, are respectively adjusted by a nipple position control device 24. Thereby, the position in the X and Y directions of the through opening 15 of the nipple 16 to the die holder 17 can be controlled arbitrary.

On the other hand, on the lower portion of the die holder 17 is received a die 26 in which a tapered nozzle 25 having diameter descending downwardly at the central portion is formed with a space to the nipple 16. The space defined between the die 26 and the nipple 16 surrounded by the die holder 17 serves as a resin pool 27. To a through hole 28 formed in the side wall portion of the die holder to communicate with the resin pool 27, is connected the one end of a coating resin supply pipe 31 for supplying the coating resin 14 adjusted at a predetermined temperature and a predetermined pressure. At the other end side of the coating resin supply pipe 31 is connected to a not shown resin supply source.

The die holder 17 and the coating resin supply pipe 31 are controlled temperature employing a not shown heater by a resin temperature control device 29. Also, the resin supplied from the resin supply source to the resin pool 27 is controlled the supplying pressure thereof by the resin supplying pressure control device 30.

The die holder 17 in which an opening 32 is formed at the center portion of the lower end, is fixed on an orthogonal movable stage 34 mounted on a orthogonal stationary stage. One of four corners of these stationary stage 33 and the movable stage 34 are pivoted via a spherical joint (pivot bearing) 35. A not shown spring for biasing these mutually over to each other is disposed between these stationary stage 33 and the movable stage 34. At the center portions of the stationary stage 33 and the movable stage 34, openings 33a and 34a for accommodating the optical fiber 12 are formed respectively.

Also, on the movable stage 34, two rod driving motors 37 downwardly projecting a tilt position correcting rods 36 for adjusting distance to the stationary stage 33, are provided at two corners adjacent the corner where the spherical joint 35 of the movable stage 34. Magnitudes of projection of the tilt position correcting rods 36 of the rod driving motors 37 are respectively adjusted by a stage tilting control device 38. Thus, the tilting angle and tilting direction of the movable stage-34 relative to the stationary stage 33 can be arbitrary controlled.

On a side wall portion of the die holder 17, two sets of illumination light introducing windows 39 and optical fiber monitoring windows 40 respectively formed of transparent pressure glass, are arranged facing each other with the resin pool 27 between in X direction and Y direction. Light source 41 for projecting an illumination light toward the center portion of the resin pool 27 is arranged respectively in the vicinity of the illumination light introducing windows 39.

When an ultraviolet curing resin is used as the coating resin 14, the light source 41 which does not have curing wavelength of the ultraviolet curing resin has to be employed, or, an ultraviolet ray cut off filter blocking the curing wavelength band has to be disposed between the light source 41 and the illumination light introducing window 39. Also, image pick-up devices 42, such as a television camera or the like for monitoring the center portion of the resin pool 27, are arranged in the vicinity of the optical fiber monitoring windows 40.

An image processing device 43 for outputting information concerning a tension of the optical fiber 12, a cooling temperature of the optical fiber, a position of the nipple 16, temperature and supplying pressure of the coating resin 14, tilting position of the movable stage 34 and so on to the foregoing fiber tension control device 11, the fiber cooling control device 13, the nipple position control device 24, the resin temperature control device 29, the resin supplying pressure control device 30, the stage tilting control device 38, on the basis of the image of the center portion of the resin pool 27 picked-up by the image pick-up device, is connected to the image pick-up device 42.

Figure 2:
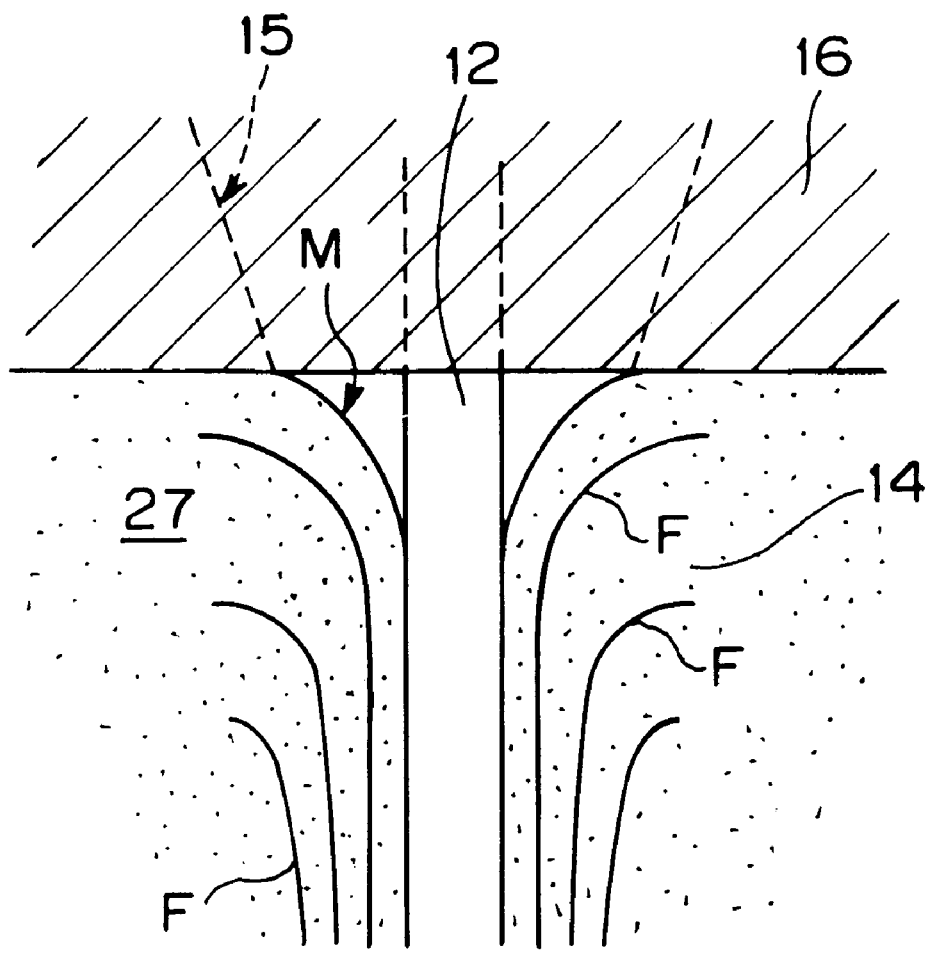
FIG. 2 is a diagrammatic illustration showing one example of an observation image of a center portion of a resin pool in the condition where a flow of the coating resin is stable.

One example of the image picked-up by the foregoing image pick-up device 42 is shown in FIG. 2. Namely, in the portion where the optical fiber 12 contacts with the coating resin 14 at the lower end of the through hole 15, the surface of the coating resin 14 is drawn lower on the side of the resin pool 27 by drawing force of the optical fiber 12 and thus meniscus M shaped funnel is observed as a dark shadow. Also, flow lines F of the coating resin 14 along feeding direction of the optical fiber 12 can be observed as bright and dark contrast at the resin flow portion in left and right lower side. Presumably because the refractive index of the resin is varied by the static pressure.

Figure 3:
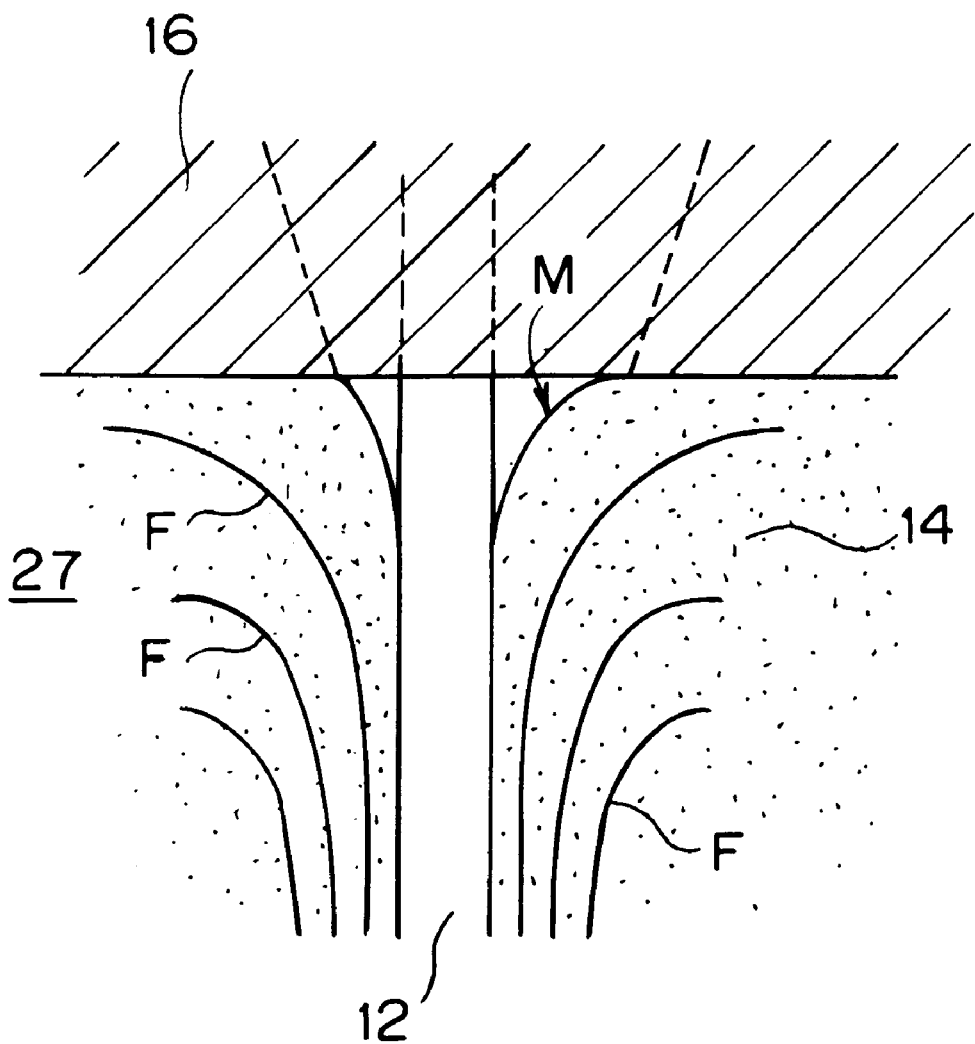
FIG. 3 is a diagrammatic illustration showing one example of an observation image of the center portion of the resin pool in a condition where a flow of the coating resin is unstable.

As shown in FIG. 3, when the meniscus M is not symmetric in left and right sides to the optical fiber 12, the flow lines F of the coating resin tend to fluctuate or non-concentricity of the coating resin 14 to the optical fiber 12 tends to increase. Furthermore, when the optical fiber 12 deflects toward left or right and the flow lines F of the coating resin 14 fluctuate, the thickness of the coating resin layer on the optical fiber 12 becomes non-uniform and non-concentricity tends to fluctuate. On the other hand, if the temperature of the optical fiber is excessively high, the flow lines F of the coating resin 14 tend to fluctuate. Similarly, when the temperature of the coating resin 14 is excessively low or the supplying pressure is excessively high, the flow lines F of the coating resin tend to cause fluctuation. Associated with this, the meniscus M cannot be symmetric in the left and the right direction to the optical fiber 12, and the optical fiber 12 may cause deflection in the left and right direction. Also, by tilting of the movable stage 34, the optical fiber 12 tends to deflect in the left and the right direction or the flow lines F of the coating resin 14 tend to fluctuate.

When the flow lines F fluctuate due to the factor set forth above, layer thickness or non-concentricity of the coating resin 14 tends to fluctuate.

On the basis of such finding, in the image processing device 43 set forth above a shape of the meniscus M and the position of the optical fiber 12 in the condition where the optical fiber 12 does not cause deflection in the left and the right direction and the flow lines F of the coating resin 14 are stable without causing fluctuation is stored. Then, by monitoring the image on-line, when the condition becomes out of the stored condition, an abnormality is detected and the device 43 outputs information concerning the cooling temperature of the optical fiber 12, the position of the nipple 16, temperature and supplying pressure of the coating resin 14, the tilting position of the movable stage 34 and the like, to the fiber cooling control device 13, the nipple position control device 24, the resin temperature control device 29, the resin supplying pressure control device 30, the stage tilting control device 38 and so on.

The fiber cooling control device 13 cools the optical fiber 12 so that the temperature of the optical fiber 12 becomes lower than or equal to the predetermined temperature. When the flow lines F of the coating resin 14 are fluctuated, the cooling temperature of the optical fiber 12 is elevated. The nipple position control device 4 adjusts the position of the nipple 16 so that the distance from the optical fiber 12 to the left and right meniscus M become equal to each other. The resin temperature control device 29 adjusts the temperature of the coating resin 14 so that the deflection magnitude can be reduced by monitoring the position of the optical fiber 12, for example, since it is difficult to detect the flow condition of the coating resin 14 quantitatively. When the flow lines F of the coating resin 14 fluctuate, the temperature of the coating resin 14 is elevated. Similarly, the resin supplying pressure control device 30 adjusts the supplying pressure of the coating resin 14 so that the resin pool 27 becomes lower than or equal to the predetermined pressure. Also, the stage tilting control device 38 operates the rod driving motors 37 to adjust tilting of the movable stage 34 so that the shape of the- meniscus M does not fluctuate but become stable, by for example, lifting the movable stage 34 at the side of the meniscus M having a shorter distance from the optical fiber 12, alternatively to lower the movable stage 34 at the side of the meniscus M having a longer distance from the optical fiber 12.

Accordingly, the optical fiber 12 drawn from the not shown optical fiber drawing furnace at a predetermined tension by the fiber tension control device 11 is cooled down to the predetermined temperature through the fiber cooling control device 13 provided right above the optical fiber coating apparatus. Thereafter, the coating resin 14 is applied on the outer periphery by the optical fiber coating apparatus. While the optical fiber passes through a resin curing device, such as a not shown ultraviolet projection device arranged right below the optical fiber coating apparatus, the coating resin 14 is cured. Then, it is taken up by a not shown winding device.

Employing the foregoing optical fiber coating apparatus, drawing of the optical fiber 12 is initiated at low speed. At this condition, as shown in FIG. 2, the shape of the meniscus M is observed to be symmetric, and the flow lines F of the coating resin 14 become stable. However, associated with the increasing of the drawing speed of the optical fiber 12, as shown in FIG. 3, the meniscus M varies asymmetrically, the optical fiber 12 deflects laterally, or the flow lines F of the coating resin 14 start to fluctuate in a vertical or circumferential direction. When the drawing speed of the optical fiber 12 is 700 m per minute, fluctuation of the external diameter is large in the extent of ±5 µm and the concentricity is low in the extent of 60%.

In the initial state, with checking of the monitoring image, the position of the nipple 16 is corrected by the nipple position control device 24 so that the meniscus M becomes symmetric to the optical fiber 12. As a result, deflection of the optical fiber 12 and disturbance of the flow lines F of the coating resin 14 are eliminated achieving a fluctuation of the external diameter of the optical fiber 12 less than or equal to ±1 µm, and a concentricity higher than or equal to 90%.

Similarly, in the initial condition set forth above, with checking of the monitoring image, the temperature of the coating resin 14 set at 40° C. is gradually elevated by the resin temperature control device 29. Associated with this, disturbance of the flow lines F of the coating resin 14 becomes smaller. The fluctuation of the flow lines F of the coating resin 14 were completely eliminated and stable when the temperature of the coating resin 14 is 45° C. Associated with this, meniscus M also becomes symmetric and deflection of the optical fiber 12 is also eliminated. At this time, fluctuation of the external diameter of the optical fiber 12 was less than or equal to ±1 µm, and concentricity was higher than or equal to 90%.

On the other hand, in the foregoing initial condition, with checking of the monitoring image, the tilt angle of the movable stage 34 was adjusted by the stage tilting control device 38. As a result, at a certain tilting level, fluctuation of flow lines F of the coating resin disappear and become stable. The meniscus M was held asymmetric, and deflection of the optical fiber 12 was eliminated. At this time, fluctuation of the external diameter of the optical fiber 12 was less than or equal to ±1 µm, and concentricity was higher than or equal to 80%.

In this case, there is no fixed directional as to which direction to tilt. However, control is performed in such a manner that the tilt angle is restricted within 10' from the completely horizontal state of the movable stage 34 in two directions by two rod driving motors 37, for example, and tilting is stopped in the direction where the fluctuation of the flow lines F are eliminated.

The fluctuation of the flow lines F of the coating resin 14 can be smaller with a smaller resin supplying pressure by the resin supplying pressure control device 30. However, it has been found to have little effect in reducing fluctuation of the external diameter to make the concentricity good. Similarly, lowering of the temperature of the optical fiber 12 by the fiber cooling control device 13 can achieve smaller fluctuation of the flow lines F of the coating resin 14. However, this has also been found to have a little effect in reducing fluctuation of the external diameter to make the concentricity good.

While the foregoing embodiment has been described with respect to the optical fiber on which the primary coating is not provided, it is possible to apply the shown optical fiber coating apparatus for the optical fiber on which the primary coating is applied, for providing the secondary coating. By performing completely the same operation, a secondary coating having small fluctuation of the external shape or non-concentricity can be applied.

Figure 4:
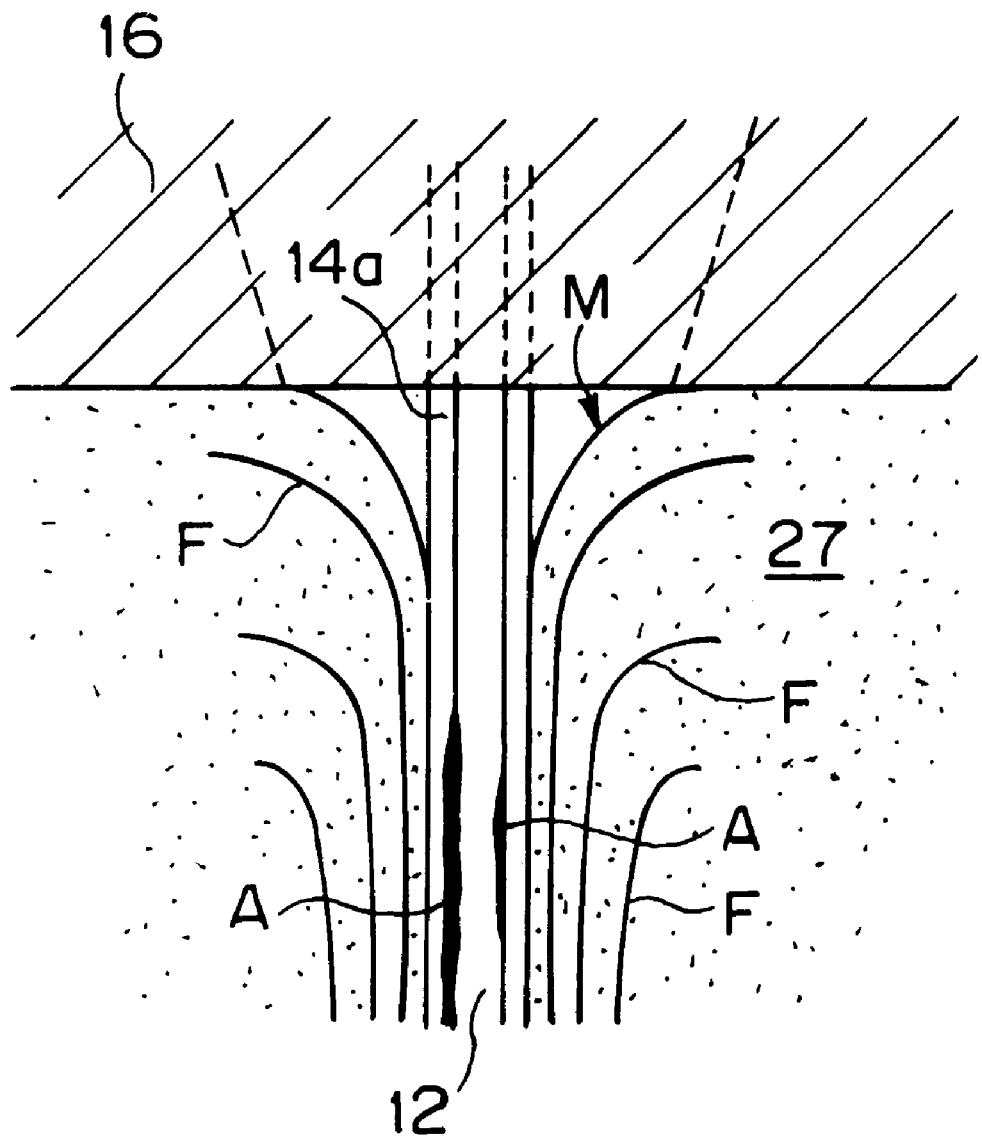
FIG. 4 is a diagrammatic illustration showing one example of an observation image of the center portion of the resin pool in a condition where bubble is admixed.

In this case, it is also possible to monitor the bubble between the optical fiber and the primary coating. Specifically, as shown in FIG. 4 illustrating such monitoring condition, a bubble A is present between the optical fiber 12 passing through the resin pool 27 in which the coating resin for secondary coating is accumulated and the primary coating layer 14a becomes dark shadow. Since this bubble A may be observed as a stripe, bubble A may be detected by taking the image of the portion of the optical fiber 12 located at the lower side of the meniscus M by image processing and checking for the presence or absence of the dark shadow or occupied area of the dark shadow.

When the bubble A is detected, the temperature of the optical fiber 12 and the coating resin 14 or the supplying pressure of the coating resin 14 is elevated by the fiber cooling control device 13, the resin temperature control device 29 and the resin supplying pressure control device 30. Also, the temperature of the optical fiber 12 and the coating resin 14 or the supplying pressure of the coating resin is adjusted with feeding back the result thereof whereby bubble A can be avoided.

While the foregoing embodiment is adapted to apply a single layer of coating resin 14 on the optical fiber 12 by setting one die 26 within the die holder 17, it is possible to apply separately a single coating layer or to sequentially overlay a plurality of kinds of coating resins by setting a plurality of dies within one die holder 17 in series.

Figure 5:
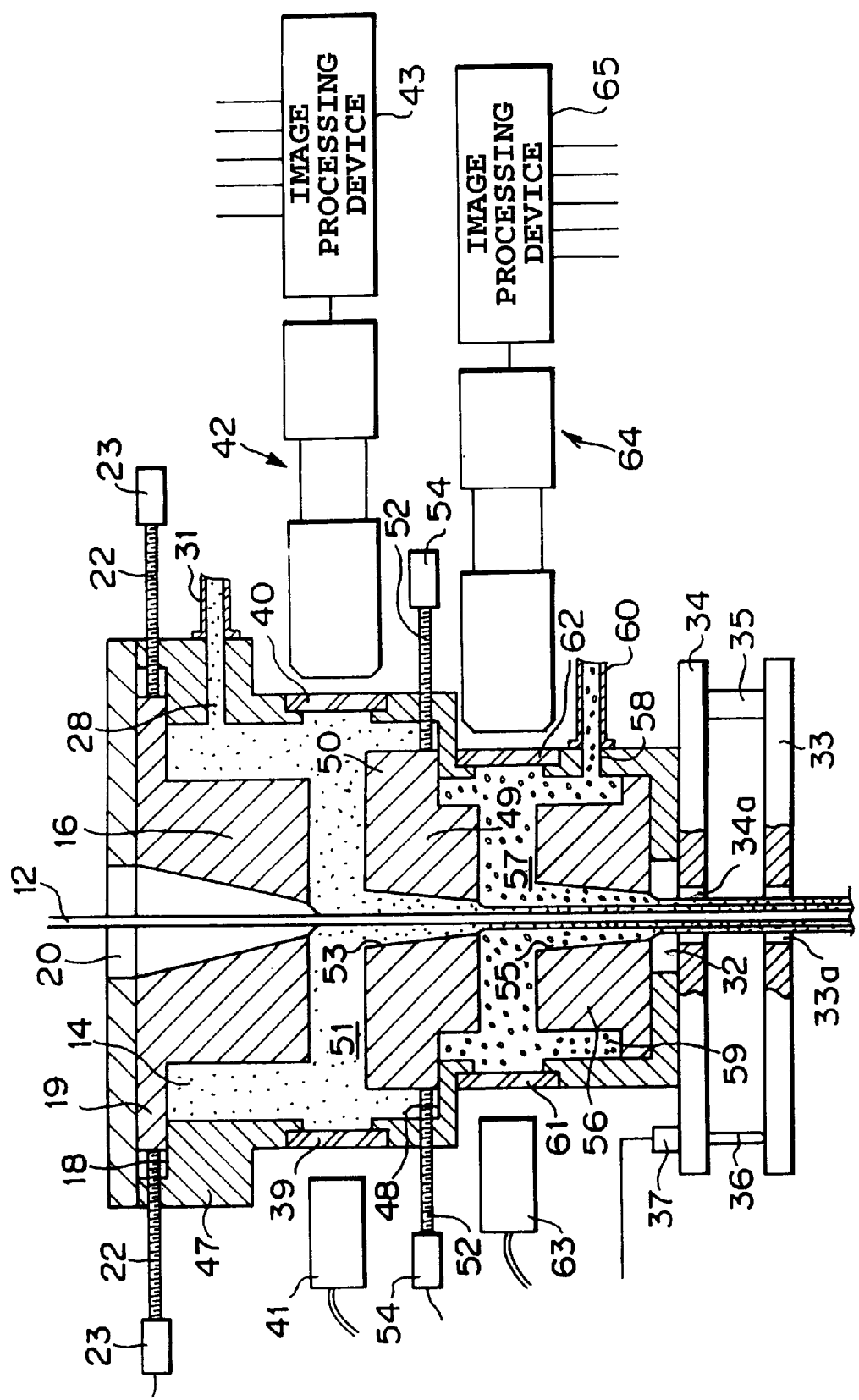
FIG. 5 is a conceptual illustration of one embodiment, in which the optical fiber coating apparatus according to the present invention is used for multi-layer coating.

General construction of such another embodiment of the present invention is illustrated in FIG. 5. It should be noted that the like elements to the former embodiment will be simply identified by like reference numerals and description therefor will be neglected. A flange portion 50 formed in a first die 49 is slidably mounted on a step portion 48 formed at the center portion of the die holder 47. A first resin pool 51 surrounded by the die holder 47 is formed between the first die 49 and the nipple 16. The one end of the coating resin supply pipe 31 for supplying to the first resin pool 51 a first coating resin 14 adjusted to a predetermined temperature and a predetermined pressure is connected to the through hole formed on the side wall portion of the die holder 47 in communication with the first resin pool 51. The other end side of the coating resin supplying supply pipe 31 is connected to the not shown resin supply source.

The temperature of the die holder 47 and the coating resin supply pipe 31 are controlled by the resin temperature control device 29 (see FIG. 1) with a not shown heater. Also, the pressure of the resin supplied from the resin supply source to the resin pool 51 is controlled by the resin supplying pressure control device 31 (see FIG. 1).

Tip ends of two sets of die position correcting screws 52 facing each other with the flange portion between with 180° of angular interval, are contacted on the outer periphery of the flange portion 50 of the first die 49 which can displace in the direction perpendicular to the passing direction of the optical fiber 12 to the die holder 47. One set of die position correcting screws 52 oppose in the X direction and the not shown the other set of die position correcting screws oppose in the Y direction. To these die position correcting screws 52, screw driving motors 54 for adjusting the screwing magnitude of the die position correcting screws 52 to the die holder 47 and whereby correcting the position of a nozzle 53 of the first die 49, are coupled respectively. The projecting positions in the diametrical direction of the die position correcting screws 52 which are connected to these screw driving motors 54, are adjusted by the not shown die position control device, respectively. Thus, the position of the nozzle 53 of the first die 49 in X direction and in Y direction to the die holder 47 can be controlled arbitrarily.

On the lower portion of the die holder 47, a second die 56 in which a tapered nozzle 55 having diameter descending downwardly at the central portion is formed with a space to the first die 49. The space between the second die 56 and the first die 49 surrounded by the die holder 47 serves as a second resin pool 57. One end of a coating resin supply pipe 60 for supplying to the second resin pool a second coating resin 59 adjusted to the predetermined temperature and the predetermined pressure is connected to a through hole 58 formed through the side wall portion of the die holder 47 and communicating with the second resin pool 57. The other end side of the coating resin supply pipe 60 is connected to a not shown resin supply source.

The temperature of the coating resin supply pipe 60 is controlled by using a not shown heater of the temperature control device 29 (see FIG. 1) together with the die holder 47 and the coating resin supply pipe 31. Also, the supplying pressure of the resin to be supplied from the resin supply source to the resin pool 57 is controlled by a not shown resin supplying pressure control device.

On the side wall portion of the die holder 47, two sets of illumination light introducing windows 39 and 61 and optical fiber monitoring windows 40 and 62 respectively formed of transparent pressure glass, are arranged facing each other with the first and second resin pools 51 and 57 between in X direction and Y direction. In the vicinity of the illumination light introducing windows 39 and 61, light sources 41 and 63 for projecting an illumination light toward the center portion of the first and second resin pools 51 and 57 are arranged respectively. When ultraviolet curing resins are used as the coating resins 14 and 59, the light sources 41 and 63 which do not have a curing wavelength of the ultraviolet curing resin has to be employed, or, an ultraviolet ray cut off filter blocking the curing wavelength band has to be disposed between the light sources 41 and 63 and the illumination light introducing windows 39 and 61. Also, image pick-up devices 42 and 64, such as a television camera or the like for monitoring the center portion of the first and second resin pool 51 and 57 are arranged in the vicinity of the optical fiber monitoring windows 40 and 62.

Image processing devices 43 and 65 for outputting information concerning a tension of the optical fiber 12, a cooling temperature of the optical fiber, a position of the nipple 16, temperature and supplying pressure of the first and second coating resins 14 and 59, tilting position of the movable stage 34 and so on to the foregoing fiber tension control device 11, the fiber cooling control device 13, the nipple position control device 24, the resin temperature control device 29, the resin supplying pressure control device 30, the stage tilting control device 38, on the basis of the image of the center portion of the first and second resin pools 51 and 57 picked-up by the image pick-up device, is connected to the image pick-up devices 42 and 64.

In the shown embodiment, similarly to the former embodiment, the layer thickness of the first and second coating resins 14 and 59 to be applied on the optical fiber 12 can be maintained uniform to restricting the non-concentricity to a minimum by employing the foregoing image processing device 43 and 65.

In the practical optical fiber manufacturing facility, the overall height of the optical fiber coating apparatus is merely about 100. Threrfore, significant difficulty should be encountered in machine design to build-in all of the foregoing position adjusting means of the position adjusting means of the die 49 or two sets of the optical fiber monitoring device in the optical fiber coating apparatus shown in FIG. 5.

Figure 6:
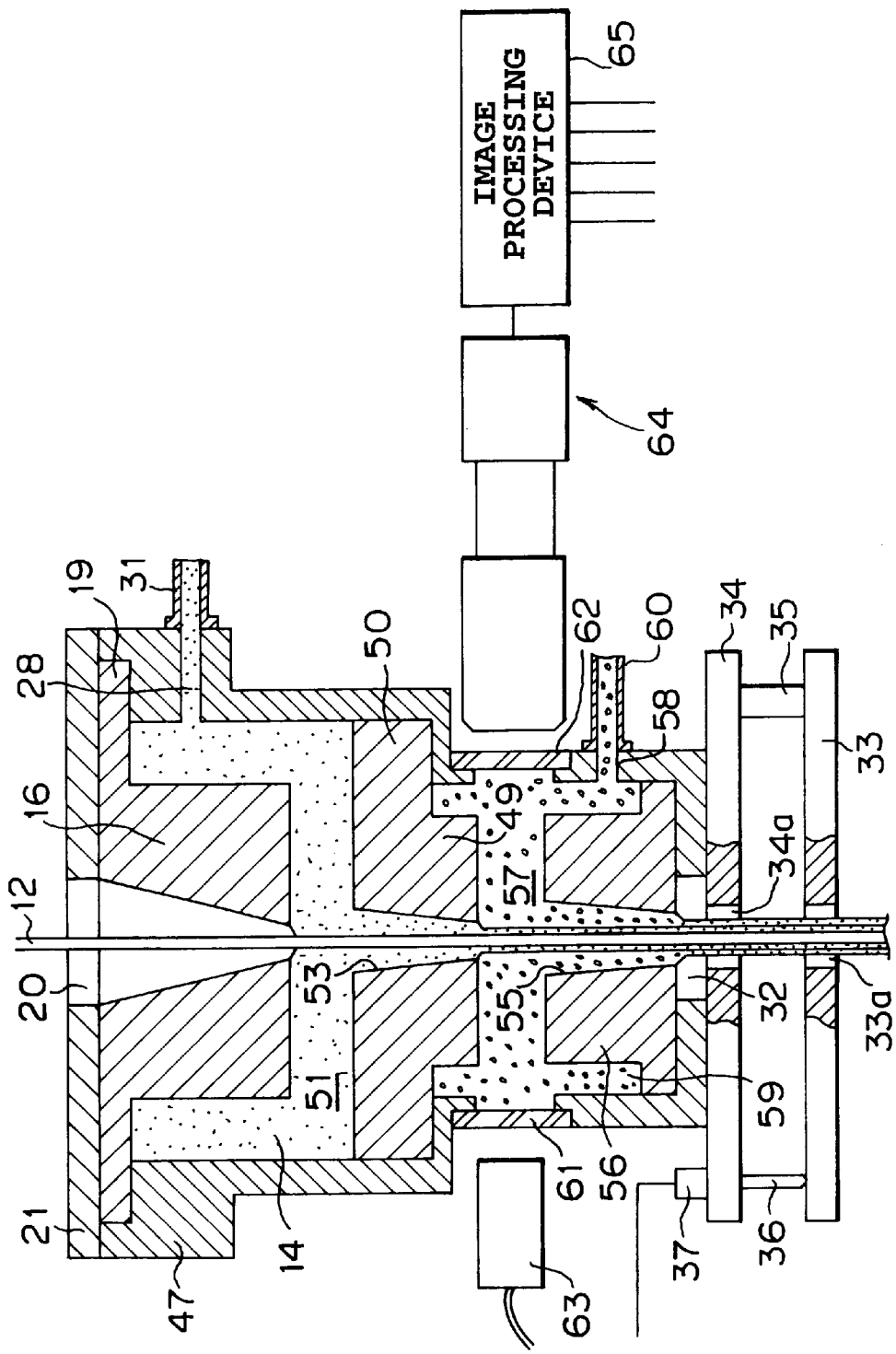
FIG. 6 is a conceptual illustration of another embodiment, in which the optical fiber coating apparatus according to the present invention is used for multi-layer coating.

In this circumstance, a more practical embodiment of the optical fiber coating apparatus is illustrated in FIG. 6. It should be noted that elements of the same function as the former embodiment will be merely identified by the same reference numerals and redundant explanations will be neglected. The shown embodiment neglects the nipple 16, the position adjusting means of the first die 49 and the optical fiber monitoring device of the first resin pool 51. Accordingly, this embodiment is established under a premise that the machining accuracy and assembling accuracy of the die holder 47, the nipple 16 and the die 49 per se are high. However, adjustment of non-concentricity and stabilization of the layer thickness of the coating resin 14 and 59 on the optical fiber 12 becomes possible.

Figure 7:
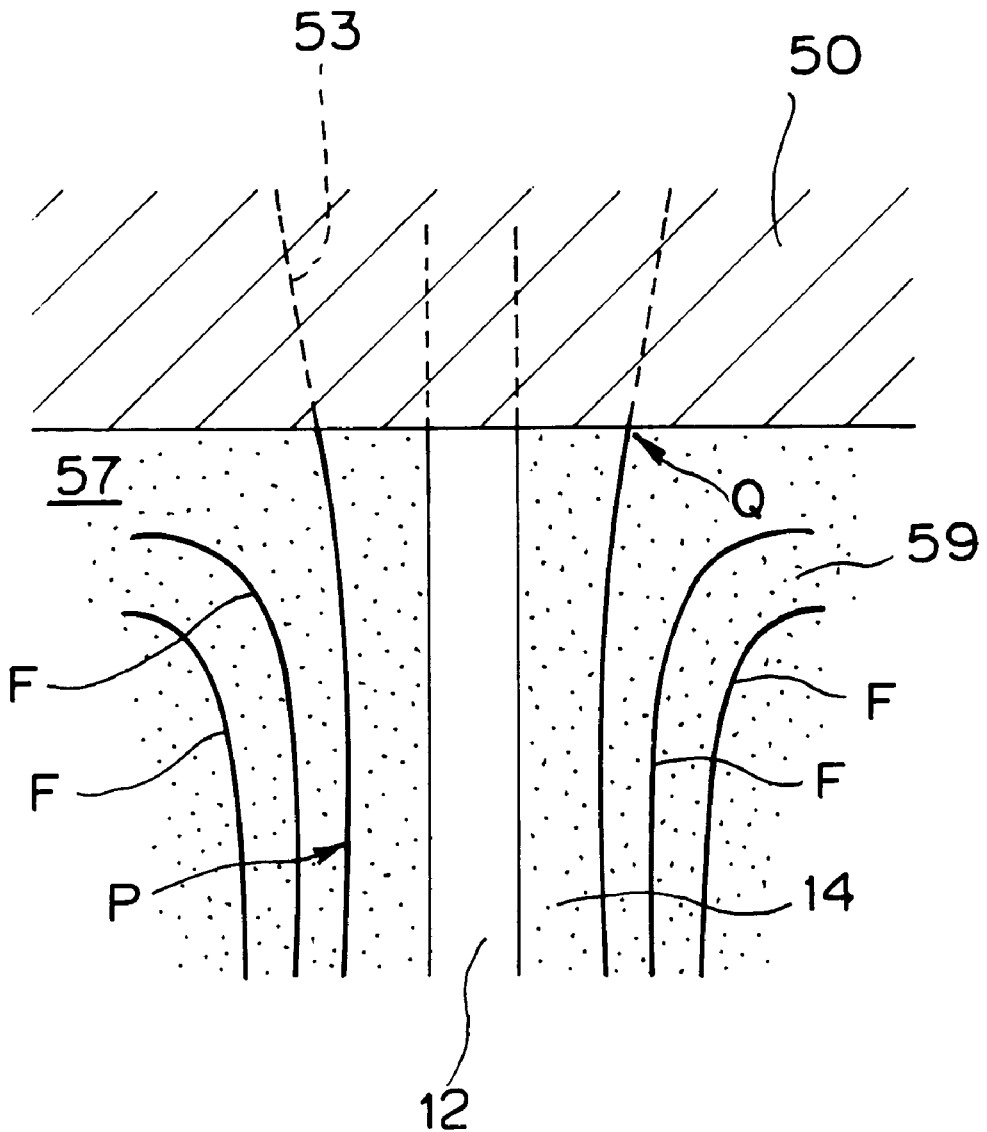
FIG. 7 is a diagrammatic illustration showing one example of an observation image of the center portion of the resin pool in the embodiment of FIG. 6.

One example of the image picked-up by the foregoing image pick-up device 64 is shown in FIG. 7. The flow lines F of the coating resins 14 and 59 in the shown embodiment were stable upon initiation of drawing. However, when the drawing speed reaches 700 m per minute, the position of the optical fiber 12 deflects and the condition of interface P between the first coating resin 14 and the second coating resin 59 and the flow lines F of the first and second coating resins 14 and 59 becomes unstable. At this time, fluctuation of the external diameter was less than or equal to ±3 $\mu$m, and concentricity of the first coating resin 14 was higher than or equal to 80% creating no problem. However, the concentricity of the second coating resin 59 became 60%.

Then, the movable stage 34 is titled within a range of 10' in two directions by two rod driving motors 37 from the title angle of completely horizontal condition. Then, the position of the deflection of the optical fiber 12, the interface P and the flow lines F of the first and second coating resins 14 and 59 were checked respectively to become stable. As a result, the fluctuation of the external diameter could be corrected to be a slightly greater than ±1 $\mu$m. Also, concentricity of the first coating resin 14 was corrected to be 85% and the second coating resin 59 was corrected to be higher than or equal to 80%.

On the other hand, at this condition, when the temperatures of the coating resins 14 and 59 are elevated from 40° C. to 44° C. with maintaining these at the same temperature, deflection of the optical fiber 12, the condition of the interface P between the first and second coating resins 14 and 59 and the flow lines F thereof becomes stable, and fluctuation of the external diameter falls within ±1 µm. However, concentricity is held unchanged. Thus, the reason to maintain the coating resins 14 and 59 at the same temperature is to avoid direct heat transmission between the first die 49 and the second coating resin 59 or direct heat transmission at the interface P between the first and second coating resins 14 and 59 causing a certain external disturbance.

In the drawing operation, it is possible to cause a dark portion to appear in the vicinity of the outlet end Q of the nozzle 53 of the first die 49, namely at the application start portion of the second coating resin 59. The dark portion means formation of a void between the first coating resin 14 and the second coating resin 59. Once such a phenomenon is caused, a bubble may be generated at the interface P between the coating resins 14 and 59. Thus, when the bubble is generated at the interface P of the coating resins 14 and 59 or the dark portion is observed in the vicinity of the outlet end Q of the nozzle of the first die 49, the supplying pressure of the second coating resin 59 is pressurized from the typical pressure of 3 kg/cm$^2$ to 3.2 kg/cm$^2$. Thereby, a bubble generated at the interface P between the coating resins 14 and 59 or the dark portion caused in the vicinity of the outlet end Q of the nozzle 53 of the first die 49 disappears.

However, when the application operation is performed with the temperature of the coating resins 14 and 59 or the supplying pressure of the second coating resin set at high value initially, it is possible that the first coating resin 14 is suddenly not deposited on the optical fiber 12, or, the second coating resin 59 is suddenly not deposited on the first coating resin 14. It becomes possible to detect such an unstable condition of the applying condition by making the external diameter smaller. However, since breakage of the optical fiber 12 can be caused in the extreme case, it is not desirable to perform the applying operation with setting the temperature of the coating resins 14 and 59 or the supplying pressure of the second coating resin at a high value initially.

Accordingly, it is preferred to set the temperature of the coating resins 14 and 59 and the supplying pressure of the second coating resin 59 at the typical values and to elevate them only when fluctuation of the external diameter or the generation of a bubble is caused.

The foregoing detailed description of the preferred embodiments of this invention has been provided for the purposes of illustration and description. It is not intended to be exhaustive or to limit the invention to the precise embodiments disclosed. Other modifications and variations may be evident to practitioners in the art when considered in reference to this disclosure.

We claim:

1. An optical fiber coating method comprising the steps of:
   providing a resin pool for a coating resin between a gate member and a die;
   passing an optical fiber from a through hole formed at a center portion of said gate member through a nozzle formed at a center portion of said die to apply said coating resin;
   applying said coating resin on said optical fiber; and
   monitoring both a portion where said optical fiber and said coating resin are in contact with each other and a vicinity thereof.

2. An optical fiber coating method as claimed in claim 1, wherein said coating resin is a primary coating resin.

3. An optical fiber coating method as claimed in claim 1, wherein said coating resin is a secondary coating resin to be applied on said optical fiber on which a primary coating is applied.

4. An optical fiber coating method as claimed in any one of claims 1 to 3, wherein a shape of a meniscus of the surface of said coating resin in said resin pool drawn associated with movement of said optical fiber is observed.

5. An optical fiber coating method as claimed in claim 4, wherein the position of said gate member is adjusted within a plane perpendicular to the passing direction of said optical fiber so that said meniscus becomes symmetric with respect to said optical fiber.

6. An optical fiber coating method as claimed in any one of claims 1 to 3, wherein, in said monitoring step, the presence and absence of a bubble between said optical fiber and said coating resin is observed.

7. An optical fiber coating method as claimed in claim 6, wherein when the bubble is monitored in said monitoring step, at least one of either a supplying pressure of said coating resin or a temperature of said optical fiber is controlled to avoid admixing of bubble.

8. An optical fiber coating method as claimed in any one of claims 1 to 3, wherein in said monitoring step a flow condition of said coating resin around said optical fiber is observed.

9. An optical fiber coating method as claimed in claim 8, wherein the temperature of said coating resin is controlled so as to stabilize the flow condition of said coating resin and to eliminate deflection of said optical fiber in a direction perpendicular to the passing direction of the optical fiber.

10. An optical fiber coating method as claimed in claim 8, wherein inclination angles of said gate member, said die and said resin pool with respect to the passing direction of said optical fiber are simultaneously adjusted so that the flow condition of said coating resin becomes stable and deflection of said optical fiber in the direction perpendicular to the passing direction of the optical fiber is avoided.

11. An optical fiber coating apparatus comprising;
   a die defining a nozzle for passing an optical fiber at a center portion;
   a gate member defining a resin pool for a coating resin between said die and said gate member and defining a through hole for passing said optical fiber at a center portion of said gate member;
   a die holder holding said die and said gate member in a spaced apart relation so as to coaxially align said nozzle and said through hole
   at least one pair of an illumination light introducing window and an optical fiber monitoring window formed facing each other in a side wall portion of said die holder with said resin pool between;
   a light source opposing said illumination light introducing window and projecting an illumination light toward the center portion of said resin pool;
   an image pick-up device opposing said optical fiber monitoring window for monitoring at least a portion where said optical fiber and said coating resin are in contact with each other and a vicinity thereof; and
   a coating condition modifying means for modifying a coating condition of said coating resin of said optical fiber in accordance with an observation result of said image pick-up device.

12. An optical fiber coating apparatus as claimed in claim 11, wherein said gate member is a nipple.

13. An optical fiber coating apparatus as claimed in claim 11, wherein said coating resin is a secondary coating resin applied on said optical fiber on which a primary coating is applied, and said gate member is a die for applying said primary coating on said optical fiber.

14. An optical fiber coating apparatus as claimed in any one of claims 11 to 13, wherein said illumination light introducing window and said optical fiber monitoring window are provided in two pairs, the direction of one pair of said illumination light introducing window and said optical fiber monitoring window is different from the direction of another pair.

15. An optical fiber coating apparatus as claimed in any one of claims 11 to 13, wherein said coating condition modifying means is a position adjusting means for adjusting a relative position between said die and said gate member.

16. An optical fiber coating apparatus as claimed in any one of claims 11 to 13, wherein said coating condition monitoring means is a resin supplying pressure adjusting means modifying supplying pressure of said coating resin into said resin pool.

17. An optical fiber coating apparatus as claimed in any one of claims 11 to 13, wherein said coating condition modifying means is a fiber temperature adjusting means modifying the temperature of said optical fiber.

18. An optical fiber coating apparatus as claimed in any one of claims 11 to 13, wherein said coating condition modifying means is resin temperature adjusting means for modifying temperature of said coating resin within said resin pool.

19. An optical fiber coating apparatus as claimed in any one of claims 11 to 13, wherein said coating condition modifying means is adjusting means of a tilt angle of said die holder in which said die and said gate member are assembled.

20. An optical fiber coating apparatus as claimed in any one of claims 11 to 13, wherein said coating resin is an ultraviolet curing resin, and the illumination light incident into said resin pool from said light source has no component of a curing wavelength band.

* * * * *